(12) United States Patent
Zhang et al.

(10) Patent No.: US 11,657,335 B2
(45) Date of Patent: May 23, 2023

(54) METHOD FOR EVALUATING RELIABILITY OF A SEALING STRUCTURE IN A MULTI-FAILURE MODE BASED ON AN ADABOOST ALGORITHM

(71) Applicant: Northwestern Polytechnical University, Shaanxi Province (CN)

(72) Inventors: Feng Zhang, Xi'an (CN); Xiayu Xu, Yidu (CN); Peng Wang, Hancheng (CN); Lei Cheng, Huangshan (CN); Haotian Xi, Weinan (CN); Yameng Wang, Zhoukou (CN); Yang Gao, Anqing (CN)

(*) Notice: Subject to any disclaimer, the term of this patent is extended or adjusted under 35 U.S.C. 154(b) by 488 days.

(21) Appl. No.: 16/944,101

(22) Filed: Jul. 30, 2020

(65) Prior Publication Data
US 2021/0056246 A1 Feb. 25, 2021

(30) Foreign Application Priority Data

Aug. 21, 2019 (CN) .......................... 201910774060.1

(51) Int. Cl.
*G06F 30/23* (2020.01)
*G06N 20/20* (2019.01)
(Continued)

(52) U.S. Cl.
CPC ........... *G06N 20/20* (2019.01); *G06F 18/211* (2023.01); *G06F 18/2415* (2023.01); *G06F 30/23* (2020.01); *G06F 30/27* (2020.01); *G06N 7/01* (2023.01); *G06T 17/20* (2013.01); *G06F 2119/02* (2020.01)

(58) Field of Classification Search
CPC . G06N 20/20; G06N 7/01; G06N 5/01; G06F 18/211; G06F 18/2415; G06F 30/23; G06F 30/27; G06F 2119/02; G06F 18/2148; G06F 18/24323; G06F 2111/08; G06F 18/214; G06F 18/2321; G06T 17/20; B64C 1/14
See application file for complete search history.

(56) References Cited

U.S. PATENT DOCUMENTS

2017/0230360 A1* 8/2017 Mosenia ................ G16H 40/67
2018/0322956 A1* 11/2018 Constantine ........... G16H 50/20
(Continued)

FOREIGN PATENT DOCUMENTS

CN 105930861 A * 9/2016 .......... G06K 9/6223
CN 103778295 B * 2/2017
(Continued)

*Primary Examiner* — Kandasamy Thangavelu

(57) ABSTRACT

A method for evaluating the reliability of a sealing structure in a multi-failure mode based on an Adaboost algorithm. The Adaboost algorithm is adopted to carry out a classification iterative training on the seal ring failure related data of a small sample until a classification error of set classifier meets a precision requirement; then the failure probability of the sealing structure is calculated under the fluctuation condition of related parameters by adopting the important sampling method, and further the reliability of the sealing structure is evaluated in the multi-failure mode. The present invention solves the problems of long time consumption and complex calculation process of reliability evaluation in multi-failure mode of the complex structure.

1 Claim, 4 Drawing Sheets

(51) Int. Cl.
*G06F 30/27* (2020.01)
*G06T 17/20* (2006.01)
*G06F 18/211* (2023.01)
*G06F 18/2415* (2023.01)
*G06N 7/01* (2023.01)
*G06F 119/02* (2020.01)

(56) References Cited

U.S. PATENT DOCUMENTS

2019/0209022 A1* 7/2019 Sobol .................... A61B 5/0022
2019/0324430 A1* 10/2019 Herzog .............. G05B 23/0283

FOREIGN PATENT DOCUMENTS

| CN | 106383927 | A | * | 2/2017 | ............. G06F 30/23 |
| CN | 106679947 | A | * | 5/2017 | ............. G01M 13/00 |
| CN | 107577603 | A | * | 1/2018 | |
| CN | 109165819 | A | * | 1/2019 | ......... G06Q 10/0639 |
| CN | 109284545 | A | * | 1/2019 | ............. G06F 30/13 |
| CN | 109357960 | | * | 2/2019 | ......... G01M 13/005 |
| CN | 109540719 | A | * | 3/2019 | ............... G01N 3/56 |
| CN | 109948295 | A | * | 6/2019 | ............... Y02P 90/30 |
| CN | 110288188 | A | * | 9/2019 | ............. G06F 17/18 |
| CN | 110363230 | A | * | 10/2019 | ............... G06N 3/08 |

* cited by examiner

METHOD FOR EVALUATING RELIABILITY OF A SEALING STRUCTURE IN A MULTI-FAILURE MODE BASED ON AN ADABOOST ALGORITHM

CROSS-REFERENCE TO RELATED APPLICATION

The present application claims priority of Chinese patent application filed on Aug. 21, 2019, with an application number 201910774060.1 and a name "a method for evaluating reliability of a sealing structure in a multi-failure mode based on an Adaboost algorithm". The entire content of the above-identified application is incorporated in the present application by reference.

TECHNICAL FIELD

The present invention belongs to structural reliability fields, is related to a method for evaluating reliability of a complicated sealing structure, and in particular to a method for evaluating reliability of a sealing structure in a multi-failure mode based on an Adaboost algorithm.

BACKGROUND

Sealing structure is widely used in modern industry field, but failure problem of the sealing structure under a complex working condition is increasingly prominent. In aerospace field, the failure of the sealing structure of the aircraft will cause serious consequences and cause a lot of losses, ranging from affecting the life of a flight, to destroying the aircraft and killing people. For the failure problem of the sealing structure under the complex working condition, researchers have done many related studies to improve the reliability of the sealing structure.

The traditional method for evaluating reliability of the sealing structure of the aircraft generally adopts the method of finite element calculation combined with Monte Carlo simulation. A failure process of the sealing structure is simulated by finite element simulation, a failure probability is calculated directly by the Monte Carlo method, and then the reliability of the sealing structure is evaluated. The method has achieved good results for a simple sealing structure and a single failure mode, but for the failure problem of sealing structure under a multi-failure mode, a lot of problems exist, such as finite element modeling is complex, calculation time is long, application range is narrow, a coupling effect of multi-failure mode is difficult to simulate and so on. The reason is that the failure reasons of the sealing structure are complex and changeable. Therefore, it is necessary to improve the method for evaluating reliability of complex structures under multi-failure modes.

Adaboost is an integrated learning algorithm. The idea of the Adaboost algorithm is to combine output of multiple weak classifiers to produce an effective classification. The main steps of the Adaboost algorithm are as follows: first, a weak learning algorithm and a sample space (x, y) are given, m groups of training data are found from the sample space, and the weight of each group of the training data is $\frac{1}{m}$.

Then the training data is iteratively operated for T times using the weak learning algorithm, after each operation, a weight distribution of the training data is updated according to the classification result, the training individuals that fail to classify are given a greater weight, and the next time being sent to the operation, the training individuals are paid more attention. The weak classifiers obtain a classification function sequence $f_1, f_2, \ldots f_T$ rough repeated iterations, each classification function is given a weight, and the better the classification result is, the greater the corresponding weight is. After T times of iterations, the final strong classification function F is obtained by weighting the weak classification function.

The important sampling method is an improved Monte Carlo simulation method. The main idea of the important sampling method is that instead of performing a sample from the given probability distribution function, the given probability distribution is modified so that the parts that make important contributions to the simulation results appear more often, thereby achieving the purpose of improving efficiency, reducing simulation time and reducing variance.

SUMMARY

In order to avoid shortcomings of the prior art, the present invention provides a method for evaluating reliability of a sealing structure in a multi-failure mode based on an Adaboost algorithm.

The present invention further provides a method for evaluating reliability of a sealing structure in a multi-failure mode based on an Adaboost algorithm, the method comprising:

step 1, constructing a training sample and a test sample, wherein when using elastic modulus, a Poisson's ratio, an oil pressure and a pre-compressed amount of an O-ring seal as features during an experimentation, and regarding that whether the sealed structure is failure after running $10^5$ hours in a same load spectrum as a binary classification label, an experiment sample is produced, and a sample volume of the experiment sample is N; wherein parameters input are independent of each other and are approximated as following a normal distribution, 80% of the experiment sample are randomly selected as the training sample, and remaining 20% of the experiment sample are selected as the test sample;

step 2, performing a classification with the training sample and the test sample using the Adaboost algorithm, wherein when using a binary classification algorithm of adaboostM1 in a Matlab toolbox, regarding a weak learner type as a decision tree, the training sample is classified for multiple rounds of training; a trained classification model is recorded as F(X), wherein X is an input feature vector of the O-ring seal, and if F(X)<0 in an input condition, the O-ring seal is deemed to be failure under the input condition; otherwise, the O-ring seal is non-failure;

step 3, calculating a failure probability using an important sampling method, wherein the failure probability of O-ring seal is calculated using the important sampling method based on expanding variance, an expansion coefficient is set to be 1.05, N sets of data are extracted and recorded as Xi, wherein i is equal to 1, 2, ..., N, and substituted into the trained classification model F(X), when $F(X_i)<0$, the O-ring seal under Xi is deemed to be failure;

$$P_f = \sum_i \frac{g_{cov}}{f_{cov}},$$

the failure probability is calculated using a formula wherein in the formula i are all possible values that make $F(X_i)<0$ true, $g_{cov}$ is a joint probability density distribution function of a design parameter after expanding the variance, and $f_{cov}$ is the joint probability density distribution function of the design parameter before expanding the variance.

The technical scheme has the beneficial effects that:

The present invention proposes a method for evaluating the reliability of a sealing structure in a multi-failure mode based on an Adaboost algorithm. The Adaboost algorithm is adopted to carry out a classification iterative training on the seal ring failure related data of a small sample until a classification error of set classifier meets a precision requirement; then the failure probability of the sealing structure is calculated under the fluctuation condition of related parameters by adopting the important sampling method, and further the reliability of the sealing structure is evaluated in the multi-failure mode. The present invention solves the problems of long time consumption and complex calculation process of reliability evaluation in multi-failure mode of the complex structure, and has an important guiding significance and practical value for evaluating the reliability and optimizing design of the complex structure in the multi-failure mode.

DETAILED DESCRIPTION OF ILLUSTRATIVE EMBODIMENTS

The present invention will now be further described in conjunction with the embodiments and drawings:

First, a classification principle of an integrated network Adaboost is as follows:

The following uses a sealing structure in a multi-failure mode as an example to illustrate the principle and convergence proof of Adaboost classification.

Figures 1, 2:
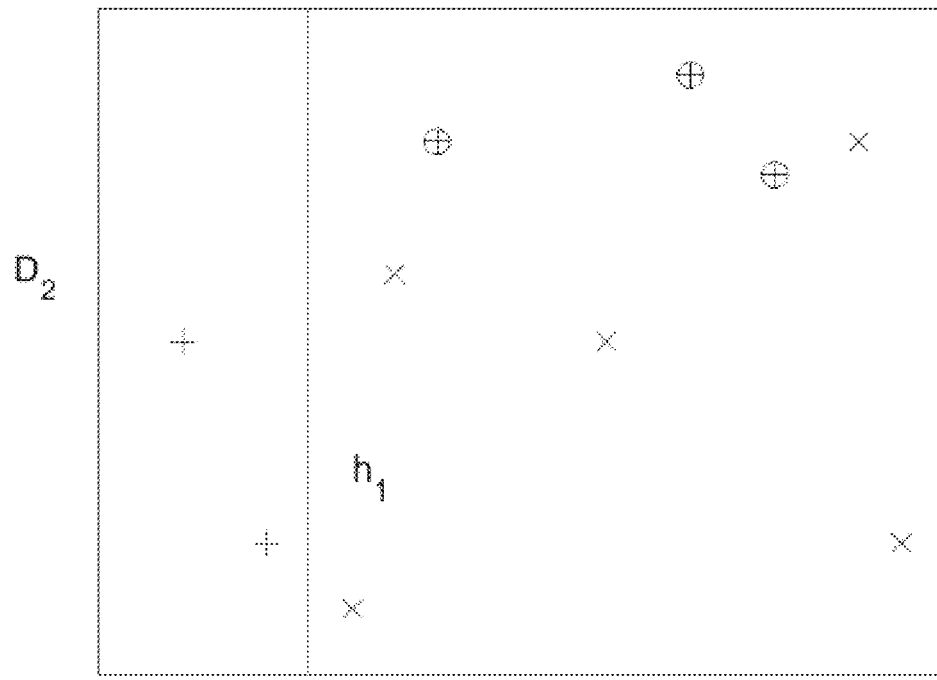
FIG. 1 illustrates a diagram of a training data distribution according to an embodiment of the present invention.
FIG. 2 illustrates a diagram of a data classification of classifier $h_1$ according to an embodiment of the present invention.

In FIG. 1, "+" and "x" in a training data set represent two categories of non-failure or failure the sealing structure is, respectively. $D_1$ is a current data distribution. In theory, each failure mode is corresponding to a curve describing a limit state equation. The curve divides the training data into two categories, two categories are failure and non-failure. However, due to insufficient research on the failure mechanism and difficult simulation of the mutual coupling of failure modes, an accurate boundary curve of a failure domain and a safety domain cannot be obtained through analytical methods or finite element methods.

An optimal classification method can be found through the Adaboost algorithm. According to the idea of Adaboost algorithm, multiple simple classifiers are required to be constructed, and then the sum of the classifiers is used as a final classifier.

In the first step, a first classifier $h_1$ is found, as shown in FIG. 2. A uniform distribution D is initially given in the Adaboost algorithm. Therefore, the weight of each point in the first classifier $h_1$ is 0.1. After a division, there are three points that are wrongly divided (the three points are samples with circles drawn in FIG. 2), and the error is calculated to be the sum of the weights of the three points wrongly divided according to an algorithm error expression $\varepsilon = P_{r_1-D_1}[h_1(x_i \neq y_i)]$, therefore $\varepsilon_1 = 0.1+0.1+0.1=0.3$, and the value of $\alpha_1$ is calculated through a first formula, the first formula is $$\alpha_t = \frac{1}{2}\ln\left(\frac{1-\varepsilon_t}{\varepsilon_t}\right).$$

As can be seen from the above formula, when $\varepsilon_t$ meets the expression $\varepsilon_t \leq 1/2$, $\alpha_t$ meets the expression $\alpha_t \geq 0$, and $\alpha_t$ increases with the decrease of $\varepsilon_t$, it means that a basic classifier of the classifier with a smaller classification error rate plays a greater role in the final classifier. Through this method, those samples that are difficult to distinguish can be focused on in the Adaboost algorithm.

In the second step, the weight of points that are wrongly divided is increased according to the algorithm. As shown in FIG. 2, for the other seven points that are rightly divided, the weight of the seven points is decreased. For the three points that are wrongly divided, the weight of the three points is calculated through a second formula, the second formula is $$D_{t+1}(i) = \frac{D_t(i)}{Z_t} \times \begin{cases} e^{-\alpha_t} & \text{若} h_t(x_i) = y_i \\ e^{\alpha_t} & \text{若} h_t(x_i) \neq y_i \end{cases},$$

In the second formula, $$Z_t = \sum_{t=1}^{N} \varpi_{ti}\exp(-\alpha_t y_i G_t(x_i)),$$

$\overline{\omega}_{ti}$ represents a sample weight coefficient in the t-th round of training, $\alpha_t$ is the sum coefficient of classifiers in the t-th round of training, $y_i$ is the actual classification result of the sample, and $G_t(x_i)$ represents classifiers in the t-th round of training.

Because $\alpha > 0$, therefore $e^{\alpha} > 1$, the weight of the sample is increased, that is the weight of the sample that is wrongly divided is increased, correspondingly the weight of the sample that is rightly divided is decreased. In this way, a new weight distribution is obtained.

Figure 3:
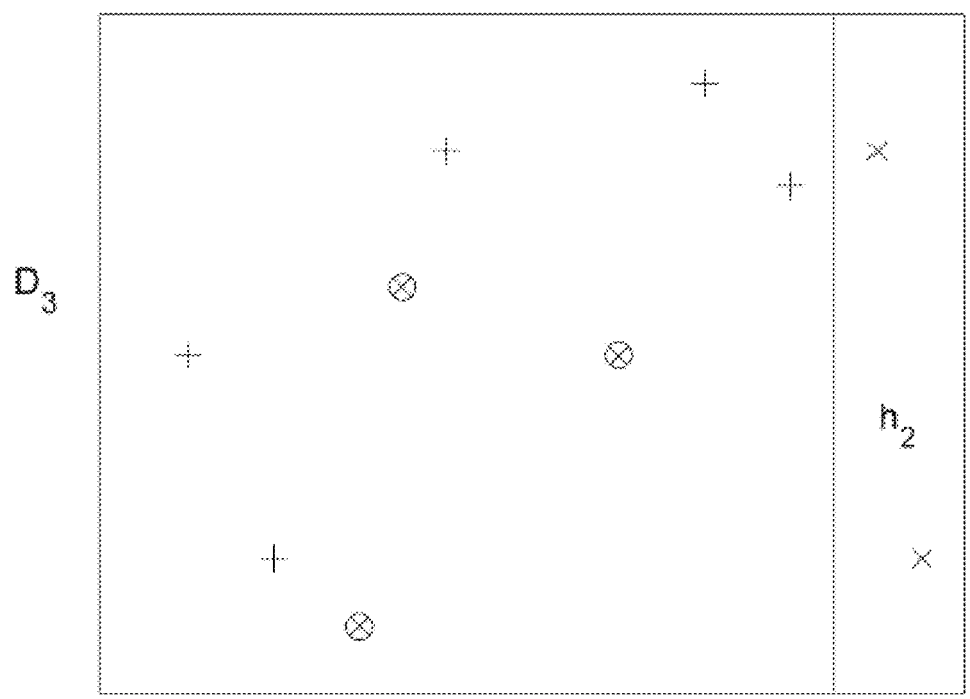
FIG. 3 illustrates a diagram of a data classification of classifier $h_2$ according to an embodiment of the present invention.

In the third step, a new sub-classifier $h_2$ and an updated sample distribution $D_3$ are obtained according to a distribution $D_2$, as shown in FIG. 3.

Figure 4:
FIG. 4 illustrates a diagram of a data classification of classifier $h_3$ according to an embodiment of the present invention.

In the forth step, a new sub-classifier $h_3$ is obtained according to the distribution $D_3$, as shown in FIG. 4.

The calculation results of the error and weight of each sub classifier are shown in Table 1.

TABLE 1 the error and weight of each sub-classifier

| sub-classifier | h1 | h2 | h3 |
|---|---|---|---|
| error $e_t$ | 0.3 | 0.21 | 0.14 |
| weight $\alpha_t$ | 0.42 | 0.65 | 0.92 |

Figure 5:
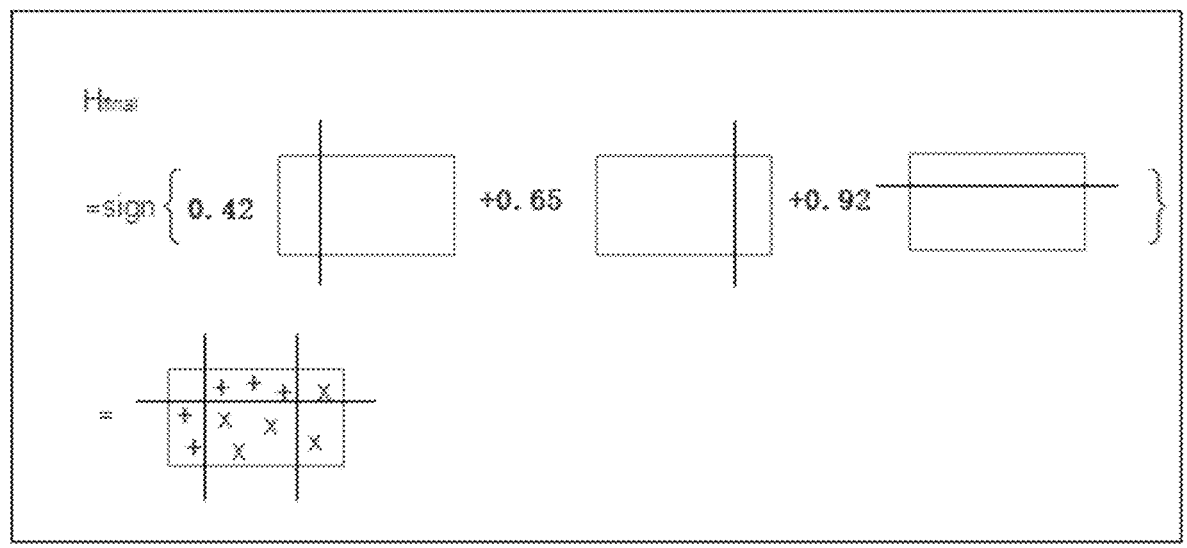
FIG. 5 illustrates a diagram of integrating all classifiers according to an embodiment of the present invention.

FIG. 5 illustrates a diagram of integrating all classifiers according to the embodiment of the present invention. As shown in FIG. 5 all sub-classifiers are integrated.

As shown in FIG. 5, with these simple classifiers, even for a linearly inseparable data set, a very low error rate can be obtained.

Second, a failure probability is calculated using an important sampling method.

Figure 6:
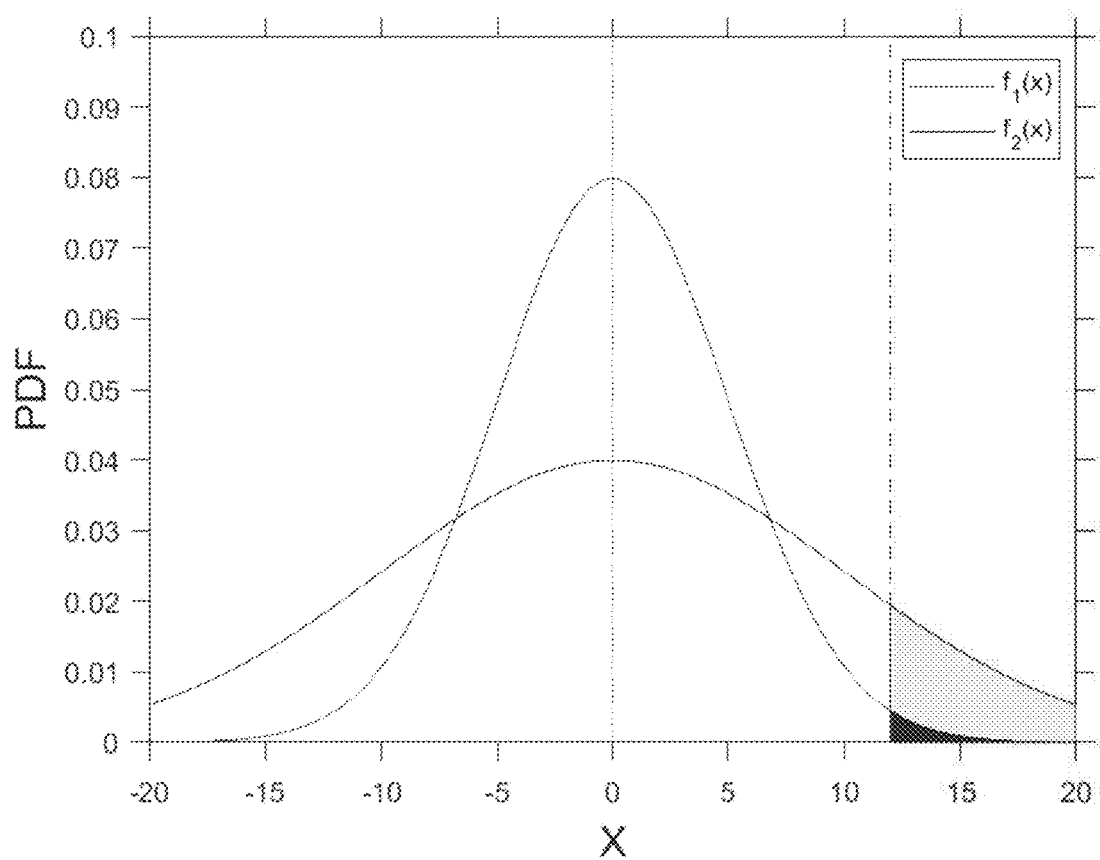
FIG. 6 illustrates a schematic diagram of important sampling method according to an embodiment of the present invention.

The present invention adopts the important sampling method based on expanding variance. By increasing the variance of the sampling sample, the frequency of failure points in the sample is increased, thereby improving the sampling efficiency. FIG. 6 illustrates a schematic diagram of important sampling method according to the embodiment of the present invention. As shown in FIG. 6, f1(x) is a probability density distribution function of the sample, the black area is the failure domain; f2(x) is the probability density distribution function after expanding the variance of the sample, and the gray area plus the black area is the failure domain. It can be clearly seen that when the failure probability is extremely small, if the Monte Carlo method is used, the number of sampling times is required to be extremely large to ensure the calculation accuracy of the failure probability, however compared to Monte Carlo method, when using the important sampling method based on variance, the number of sampling times is reduced to a considerable extent, and the calculation efficiency has been greatly improved while the calculation accuracy is ensured. For the structural optimizing design problems, engineers need to quickly assess the impact of changing the relevant parameters of the structure on the failure probability of structural. Using the important sampling method based on expanding variance to calculate the failure probability can significantly improve the calculation speed. The formula of the important sampling method based on expanding variance is $$P_f = \frac{1}{N} \sum_{i=1}^{n} \frac{h_{cov}^i}{f_{cov}^i},$$

wherein N is the times of sampling, $h_{cov}^i$ is a joint probability distribution function of the sample points passed by the i-th failure judgment of the expanded variance sample, and $f_{cov}^i$ is the joint probability distribution function of original sample corresponding to the sample points passed by the i-th failure judgment of the expanded variance sample.

Figure 7:
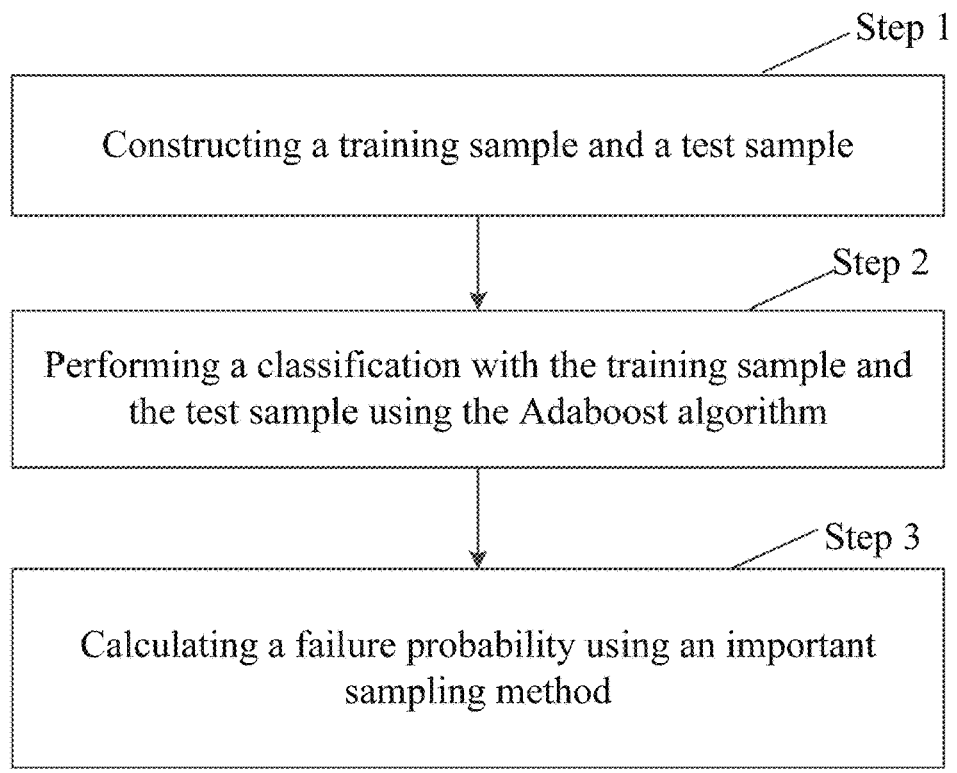
FIG. 7 illustrates a flowchart of a method for evaluating reliability of a sealing structure in a multi-failure mode based on an Adaboost algorithm according to an embodiment of the present invention.

In the embodiment, referring to FIG. 7, FIG. 7 illustrates a flowchart of a method for evaluating reliability of a sealing structure in a multi-failure mode based on an Adaboost algorithm according to the embodiment of the present invention, the method for evaluating reliability of a sealing structure in a multi-failure mode based on an Adaboost algorithm provided in the present invention includes steps as follows:

Step 1, constructing a training sample and a test sample, wherein when using elastic modulus, a Poisson's ratio, an oil pressure and a pre-compressed amount of an O-ring seal as features during an experimentation, and regarding that whether the sealed structure is failure after running $10^5$ hours in a same load spectrum as a binary classification label, an experiment sample is produced, and a sample volume of the experiment sample is 2000; wherein parameters input are independent of each other and are approximated as following a normal distribution, 1600 sets of data (which is the experiment sample) are randomly selected as the training sample, and remaining 400 sets of data are selected as the test sample.

Figure 8:
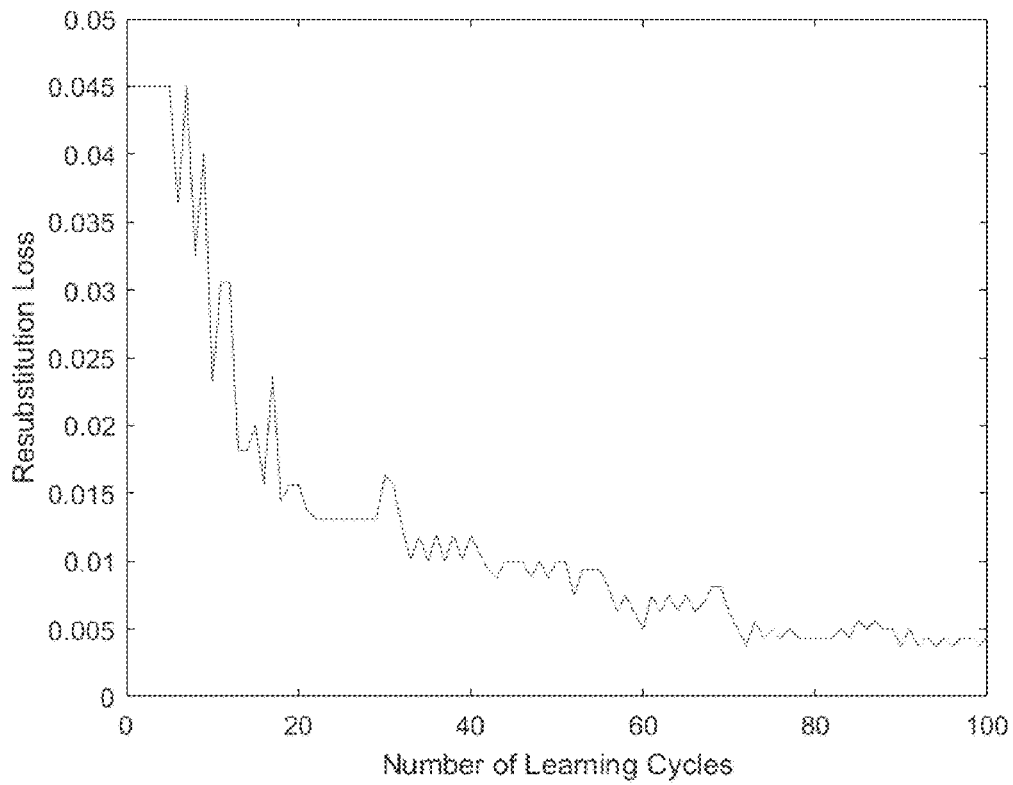
FIG. 8 illustrates a diagram of relationship between training times and errors.

Step 2, performing a classification with the training sample and the test sample using the Adaboost algorithm, wherein when using a binary classification algorithm of adaboostM1 in a Matlab toolbox, regarding a weak learner type as a decision tree, the training sample is classified for 100 rounds of training. As shown in FIG. 8, FIG. 8 illustrates a diagram of relationship between training times and errors.

It can be seen that as the number of training rounds increases, the error of the training model converges to a minimum.

A trained classification model is recorded as F(X), wherein X is an input feature vector of the O-ring seal, and if F(X)<0 in an input condition, the O-ring seal is deemed to be failure under the input condition; otherwise, the O-ring seal is not non-failure.

Using the trained model, the classification labels of 400 sets of data of the test sample can be predicted and compared with the analysis results of finite element, and the classification error rate is calculated as: error=1.75%. Compared with the traditional finite element simulation method, the Adaboost classification model greatly improves the accuracy of sample failure determination in a critical state.

Step 3, calculating a failure probability using an important sampling method.

The reliability of the newly structure design of the O-ring seal proposed by the engineer is evaluated. The parameters are shown in Table 2.

TABLE 2

| | Design Parameters | | | |
|---|---|---|---|---|
| Design Parameters | elastic modulus of O-ring seal | Poisson's ratio of O-ring seal | pre-compressed amount of O-ring seal | oil pressure of O-ring seal |
| Mean value | 13.4 | 0.398 | −0.8 | 5.34 |
| Standard deviation | 0.268 | 0.00796 | 0.024 | 0.1068 |

In order to further improve the calculation efficiency, the failure probability of O-ring seal is calculated using the important sampling method based on expanding variance. An expansion coefficient is set to be 1.05, 2000 sets of data are extracted and recorded as $X_i$, wherein i is equal to 1, 2, ..., 2000, and substituted into the trained classification model F(X), when $F(X_i)<0$, the O-ring seal under $X_i$ is deemed to be failure.

The failure probability is calculated using a formula $$P_f = \sum_i \frac{g_{cov}}{f_{cov}},$$

wherein in the formula i are all possible values that make $F(X_i)<0$ true, $g_{cov}$ is a joint probability density distribution function of a design parameter after expanding the variance, and $f_{cov}$ is the joint probability density distribution function of the design parameter before expanding the variance. The failure probability is calculated to be $P_f=0.00034$.

If the finite element calculation is directly invoked by the Monte Carlo method, in order to achieve the requirement that the variation coefficient of the failure probability estimation is 0.1, the finite element model is required to be called more than $2.9\times10^5$ times, and the finite element model calculation is taken about 3 minutes at a time, and the estimated taken time may be 14500 hours, about 604 days. The present invention uses a joint analysis based on the Adaboost algorithm and the important sampling method, the finite element is required to be called only 2000 times to obtain the training sample, thereby calculating the Adaboost integrated algorithm parameters, and then calculating the failure probability, and about 16 hours is taken in the whole process. It can be seen that the proposed reliability evaluation method has significant advantages over traditional methods in terms of the calculating speed.

The invention adopts the Adaboost algorithm to continuously and simply classify the training data of the sealing structure, and then integrates an integrated classifier with extremely high accuracy. Through the important sampling method based on expanding variance, the sampled samples are substituted into the trained classifier to perform a determination, thereby the failure probability of the sealing structure is calculated. Compared with traditional reliability evaluation method, the number of times the method calls the finite element model is greatly reduced, the calculation efficiency is significantly improved, and the calculation time is shortened. The invention proposes a reasonable and convenient method for calculating the failure probability of the complex structure in multi-failure mode, which lays the foundation for designers to evaluate the reliability and optimize design of the complex structure.

What is claimed is:

1. A method for evaluating reliability of a sealing structure in a multi-failure mode based on an Adaboost algorithm, the method comprising:

step 1, constructing a training sample and a test sample, wherein when using elastic modulus, a Poisson's ratio, an oil pressure and a pre-compressed amount of an O-ring seal as features during an experimentation, and regarding that whether the sealed structure is failure after running $10^5$ hours in a same load spectrum as a binary classification label, an experiment sample is produced, and a sample volume of the experiment sample is N; wherein parameters input are independent of each other and are approximated as following a normal distribution, 80% of the experiment sample are randomly selected as the training sample, and remaining 20% of the experiment sample are selected as the test sample;

step 2, performing a classification with the training sample and the test sample using the Adaboost algorithm, wherein when using a binary classification algorithm of adaboostM1 in a Matlab toolbox, regarding a weak learner type as a decision tree, the training sample is classified for multiple rounds of training; a trained classification model is recorded as F(X), wherein X is an input feature vector of the O-ring seal, and if F(X)<0 in an input condition, the O-ring seal is deemed to be failure under the input condition; otherwise, the O-ring seal is non-failure;

step 3, calculating a failure probability using an important sampling method, wherein the failure probability of O-ring seal is calculated using the important sampling method based on expanding variance, an expansion coefficient is set to be 1.05, N sets of data are extracted and recorded as $X_i$, wherein i is equal to 1, 2, ..., N, and substituted into the trained classification model F(X), when $F(X_i)<0$, the O-ring seal under $X_i$ is deemed to be failure;

the failure probability is calculated using a formula $$P_j = \sum_i \frac{g_{cov}}{f_{cov}},$$

wherein in the formula i are all possible values that make $F(X_i)<0$ true, $g_{cov}$ is a joint probability density distribution function of a design parameter after expanding the variance, and $f_{cov}$ is the joint probability density distribution function of the design parameter before expanding the variance.

* * * * *